United States Patent
Deker et al.

(10) Patent No.: US 6,181,987 B1
(45) Date of Patent: *Jan. 30, 2001

(54) METHOD OF ASSISTANCE IN THE PILOTING OF AN AERODYNE

(75) Inventors: Guy Deker, Chaville; Muriel Bomans, Antony, both of (FR)

(73) Assignee: Sextant Avionique, Velizy-Villacoublay (FR)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/921,340

(22) Filed: Aug. 29, 1997

(30) Foreign Application Priority Data

Aug. 30, 1996 (FR) ................................. 96 10621

(51) Int. Cl.$^7$ ................................. G06F 17/00
(52) U.S. Cl. ................... 701/3; 701/14; 701/10; 340/500; 244/75 R; 244/194
(58) Field of Search ................... 701/3, 10, 14, 701/300, 301, 302, 16, 17, 18; 244/75 R, 194; 340/500, 517, 523; 342/29, 32, 33

(56) References Cited

U.S. PATENT DOCUMENTS 3,582,949 * 6/1971 Forst .................................. 340/410
5,153,836 * 10/1992 Fraughton et al. .................. 701/301
5,398,186 * 3/1995 Nakhla .................................. 701/16

FOREIGN PATENT DOCUMENTS 2 677 149  12/1992  (FR).
2 694 104  1/1994  (FR).
2 694 106  1/1994  (FR).

* cited by examiner

Primary Examiner—William A. Cuchlinski, Jr.
Assistant Examiner—Yonel Beaulieu
(74) Attorney, Agent, or Firm—Oblon, Spivak, McClelland, Maier & Neustadt, P.C.

(57) ABSTRACT

The disclosed method is implemented by a system aboard an aerodyne comprising a processor, a terminal and memories in which there are stored all the information necessary for the carrying out of a flight, the system being connected to the other on-board electronic equipment. In order to define a new flight plan to meet a new situation caused by an event, the method comprises: the interpretation of the event to determine the corrective actions to be undertaken given the context in which the aerodyne is located, the analysis of the possibilities of reconfiguring the flight plan that correspond to the corrective actions, according to predetermined and modifiable criteria, the selection of the flight plan solutions that meet the predetermined criteria, and the presenting of these flight plan solutions in association with the significant parameters that have served as the grounds for their selection.

19 Claims, 3 Drawing Sheets

METHOD OF ASSISTANCE IN THE PILOTING OF AN AERODYNE

BACKGROUND OF THE INVENTION

1. Field of the Invention

The present invention relates to a method of assistance in the piloting of an aerodyne designed more particularly to facilitate the pilot's tasks, especially with regard to the choice of a diversion flight plan.

It can be applied especially but not exclusively to civil and commercial aviation, where the need to cope with major increases in air traffic and at the same time to improve safety levels entails numerous constraints for the pilot who has to take a large volume of information into account before making a decision, for example to work out and choose a new flight plan that becomes essential following an unexpected event.

2. Description of the Prior Art

Piloting assistance methods have already been proposed. These methods facilitate access to the various types of information needed to pilot an aerodyne in commercial use. However, these various methods have not been conceived with a view to assistance with decision-making.

Systems of assistance with decision-making have also been proposed. These systems can be used to devise one or more solutions to a problem by computing a large number of solutions and making a selection on the basis of one or more particular criteria that are predetermined. However, the solution identified by the system as being the best one does not necessarily correspond to the best possible choice and, in the context of civil aviation, the pilot must himself be capable of making a fully knowledgeable selection of the solution that will be finally adopted.

SUMMARY OF THE INVENTION

The present invention is aimed at removing these drawbacks and at improving the ergonomic quality of the man/machine interface. To this end, it proposes a method of assistance with the piloting of an aerodyne implemented by a system comprising a processor, at least one man/machine communications terminal including a display screen and a control and data entry unit, and memories in which there are stored, in particular, all the information necessary for the carrying out of a flight, the system being connected to the other electronic equipment on board the aerodyne.

In order to define a new flight plan to meet a new situation caused by a disturbing event, the method of the invention comprises the following steps:

the monitoring of the context in which the aerodyne is located and the interpretation of the event to determine the possible corrective actions to be undertaken, the analysis of the possibilities of reconfiguring the flight plan that correspond to the corrective actions defined at the preceding stage, according to a set of criteria that are predetermined and capable of being modified by the pilot, the devising of the flight plan solutions that meet the predetermined criteria, and the presenting, to the pilot, of these flight plan solutions in association with the significant parameters that have served as the grounds for their devising.

According to the invention, the corrective actions, if any, are determined as a function of the event and in the light of the context in which the aerodyne is located.

Through these arrangements, the pilot can determine the reason why a flight plan has been selected by the system as a solution to the specific difficulty resulting from the occurrence of the event. He can thus make a fully knowledgeable choice of the flight plan that appears to him to be most appropriate to the situation encountered.

More specifically, the method of the invention comprises the performance of the following steps:

the reception by the processor of an item of information announcing the disturbing event, the defining by the processor of a corrective action, the displaying, on the display screen, of the corrective action to be undertaken, the computation, by the processor, of the flight plan solutions that correspond to the corrective action and meet a set of criteria that are predetermined and capable of being modified by the pilot, the computation being performed on the basis of a navigation data base contained in the memories and of the data given by the on-board equipment, the display, on the display screen, of a navigation map, the display, on the navigation map, of the flight plan solutions in association with the criteria justifying their selection as solutions, the display, on request, of detailed information on a flight plan indicated by the pilot from among the flight plan solutions displayed on the navigation map of the display screen.

The various corrective actions to be taken following the occurrence of the disturbing event consist of a diversion (the modification of the destination airport), a modification of the lateral flight plan, or a modification of the vertical flight plan. The disturbing event may correspond to the detection of a dangerous weather phenomenon or a serious malfunctioning of the aerodyne, or to a problem at the destination airport, in the air traffic control system, or with regard to the passengers of the aerodyne.

In the case of a multiplicity of disturbing events, the corrective actions are determined and processed by order of priority.

Advantageously, the method further includes showing the pilot the limit point or boundary point of the active flight plan to activate the new flight plan, as well the time and distance up to this point.

According to one characteristic of the invention, the method comprises the display of the reasons for which a flight plan previously indicated by the pilot has been selected as a solution and includes the display of the reasons for which a previously indicated airport has been selected or not selected as a solution.

According to another characteristic of the invention, the method comprises the detailed presentation, at a second level, of all the data taken into account by the system for the examination of each solution.

According to another characteristic of the invention, each flight plan solution of a diversion is computed by using the segments of air routes and by taking account of the approach and arrival procedures at the corresponding diversion airport.

BRIEF DESCRIPTION OF THE DRAWINGS

An embodiment of the device according to the invention shall be described hereinafter, by way of a non-restrictive example, with reference to the appended drawings of which.

MORE DETAILED DESCRIPTION

Figure 1:
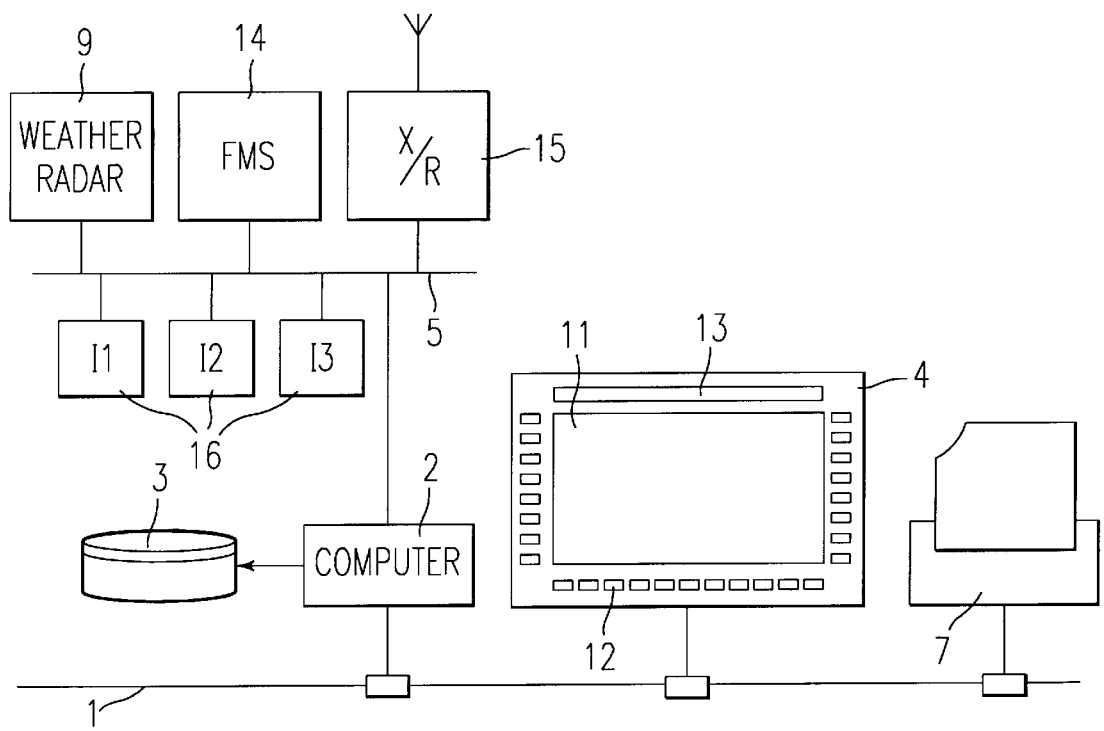
FIG. 1 gives a schematic view of a system implementing the method according to the invention.

FIG. 1 shows a system set up on board an aerodyne having a local network 1 to which there are connected:

a computer 2 connected to a mass storage unit 3 in which there are stored, for example in the form of a data base, all the information normally found in the form of printed documents in the cockpit of an aerodyne, at least one man/machine communications terminal 4 adapted for use in the cockpit of an aerodyne where the available space is relatively small, and if necessary, a printer making it possible for the pilot to print the page displayed on the display screen of the terminal 4.

The computer 2 is furthermore connected by means of the aircraft buses 5 to the other electronic equipment installed on board the aerodyne such as, in particular:

a weather radar 9 periodically providing information making it possible to reconstitute the contour of weather zones associated with a level of danger, a flight management system (FMS) device 14 carrying out automatic flight control according to a detailed preset flight plan, a digital data radio transmission device 15, for example a data link device, and navigation instruments 16.

The information stored in the mass storage unit 3 relates for example to:

flight manuals, navigation maps relating to the areas flown over and the air routes, documentation concerning each airport of the area flown over, including especially takeoff and landing procedures, approach procedures and arrival procedures, operation manuals, description of the equipment and maintenance of the aerodyne etc.

The mass storage unit also stores a base of rules associating each event that requires a modification of the flight plan with one or more corrective actions to be applied to the current flight plan.

The corrective actions if any are determined by the knowledge of the event and of the current context of the aerodyne. The event is interpreted as part of the context monitoring operation.

The terminal 4 comprises a rectangular display screen 11 in landscape mode and a control unit comprising keys 12 distributed all around the screen 11. The keys to the left of the screen are reconfigurable according to the page displayed on the screen, and provide access to the basic functions of the system. The lower keys are used for the management of the display. The keys to the right provide for the display, in an overlay on the navigation map of the area flown over, of the data necessary for navigation (pertaining to airports, beacons etc.). The upper keys provide access to the previously activated basic functions.

The upper keys are advantageously constituted by a strip 13 comprising a display unit on which there is superimposed a transparent sensitive surface that can be used to detect the position of the operator's finger. The display unit is used to indicate the description of the reconfigurable keys corresponding to the preceding pages in the calling order. These keys thus enable these pages to be reviewed quickly.

The control unit may also include a transparent tactile surface placed on the screen 11.

Figure 2:
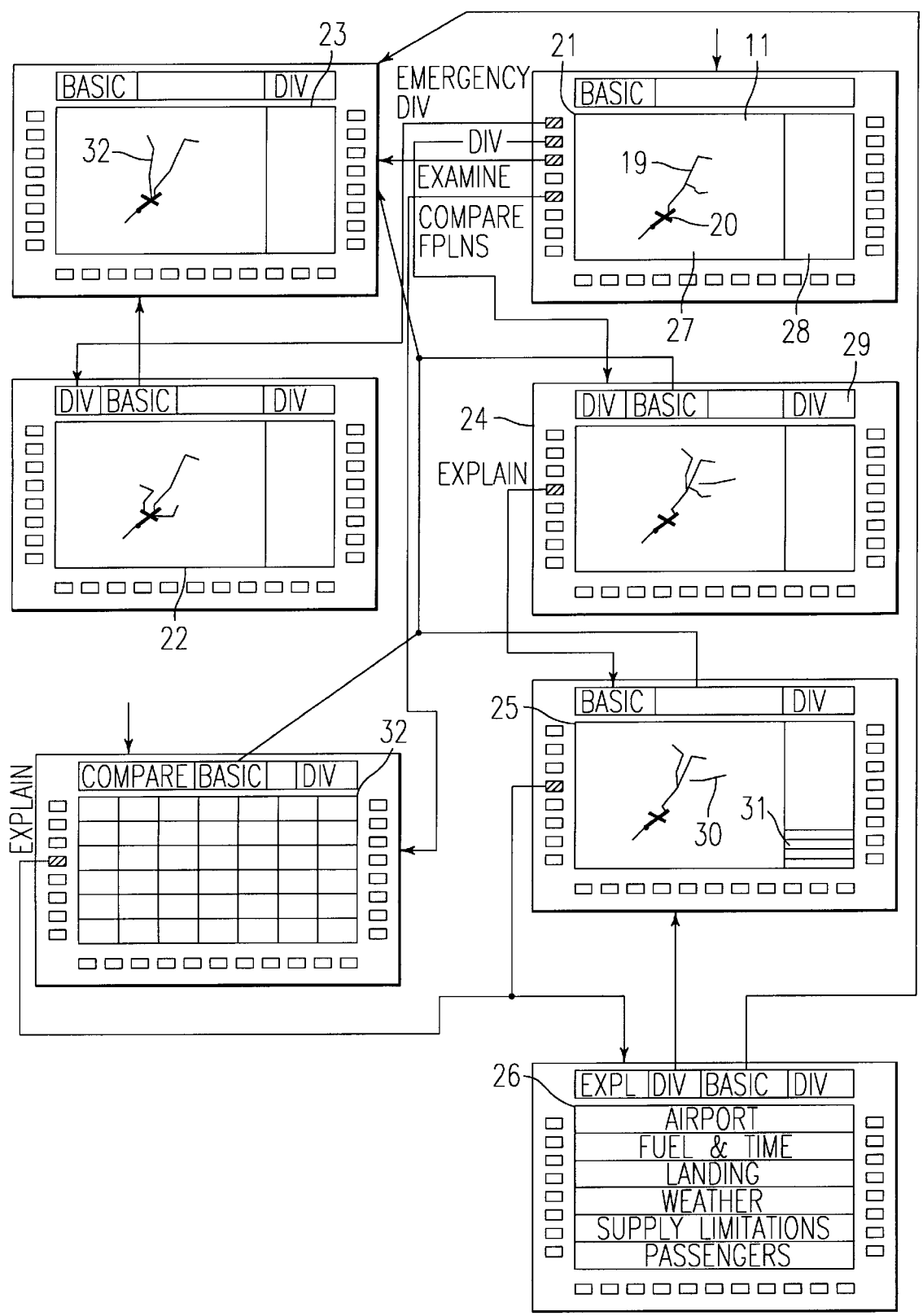

FIG. 2 represents the sequencing of various pages displayed on the screen 11 during the dialogue that occurs following the activation of the function of diversion which determines new flight plans for flight towards diversion airports, when the initially planned airport of destination is no longer accessible to the aerodyne.

Such a situation arises at the occurrence of the following events, indexed in the base of rules stored in the mass storage unit 3:

the weather conditions in the area in which the airport of destination is located are far too bad to permit landing under sufficient conditions of safety, the airport of destination is congested or closed, the infrastructure of the airport of destination is no longer adequate (because of a shortage of supplies, the impossibility of making repairs, etc.), whereas maintenance or repairs are needed, air traffic control in the area of the airport of destination is out of service or congested, a serious malfunctioning or a malfunctioning that affects the flying range of the aerodyne has been detected, and a problem has arisen concerning the passengers (piracy, a medical emergency, a bomb scare etc.).

These events are entered into the system either by means of the data link 15 with the ground for problems relating to the destination airport, air traffic control or weather conditions, or by means of the weather radar 9 for problems of weather, or by means of the FMS or the other electronic equipment of the aerodyne in the event of malfunction. All these events can also be entered into the system by the pilot who can be informed of it directly, especially in the event of problems relating to the passengers, or by a vocal radio transmission.

When the system is activated, the screen 21 shown on FIG. 2 appears on the terminal 4. This screen has two windows, namely a graphic window 27 located on the left-hand part of the screen, displaying the image of the navigation map of the area flown over by the aerodyne, and a textual window 28 located in the right-hand part of the screen 11.

The textual window 28 provides a certain number of parameters on the flight plan followed by the aerodyne, as well as the diversion flight plan initially envisaged for a situation where the airport of destination is not accessible. These parameters relate for example to the distance still to be travelled, the amount of time required, the volume of fuel remaining at the destination etc.

This window also includes a part reserved for the display of the messages of the system, indicating for example the occurrence of an unexpected event.

In the graphic window 27, the following particulars are also displayed in overlay on the image of the navigation map, giving the geographical contours of the area flown over.

a graphic symbol 20 representing the aerodyne, indicating the current position of the aerodyne relative to the map portion displayed, this position being given to the computer 2 by the radionavigation instruments 16, the flight plan followed by the aerodyne indicated by a line 19 formed by a succession of straight segments, and the position of the airports, and possibly their names if the scale of representation of the map allows it.

Moreover, using appropriate commands, the pilot can ask for the display, in an overlay on the map, of symbols representing certain objects necessary for air navigation such as, for example, the radionavigation beacons, airports, air routes, areas and frequencies of control, restricted-access areas with their periods of access, or again the weather maps.

If the pilot, starting from the screen 21, presses the key DIV for determining a flight plan towards a diversion airport, the screen 24 is displayed, and he or she is asked to define the cause of the diversion, if it is not known to the computer 2, as well as the criteria of selection of the new flight plan. This screen 24 is also displayed when the computer has received a message, by means of the aircraft buses 5, about an event requiring a diversion, the message being then displayed in the message zone of the textual window 28 of the screen 24.

In addition to the objects displayed on screen 21, the graphic window shows the boundaries of the area in which a search is made for a diversion airport. This area is for example circular and centered by default on the destination airport if the diversion is not urgent (it is then a standard diversion). If the diversion is urgent (see description below of EMERGENCY DIV key), then this area is centered on the next Way Point of the active flight plan or on the current position of the aerodyne. Of course, the center of this area and its radius can be modified.

In particular, the radius of this area can increase until a minimum number of solutions (accessible airports) is found, unless it proves to be impossible for the aerodyne, given its flying range in terms of fuel and its flight profile, to complete this extended journey.

The computer 2 then determines the various flight plan solutions (a flight plan solution preferably comprises segments of air routes with optimal speed and flying height) in applying the corrective actions, associated with the disturbing event that has occurred, to the current flight plan, these corrective actions being provided by the base of rules. In the present case, the corrective action consists of a diversion towards another airport. The computer thus prepares the various flight plans leading to each airport located in the area of research, taking into account the criteria of selection and optimization indicated in the textual part 28 of the screen.

When there is a multiplicity of causes for modifying the flight plan, the corrective actions are classified and processed according to a predetermined set of priorities.

Apart from the boundaries of the area of research, the criteria of selection of a diversion airport, classified according to a predetermined order as a function of their importance, are the following:

fuel range, the possibility of landing at the diversion airport given its state of congestion, the state of its runways, and weather conditions, the possibility of taking off again (depending on the state of the infrastructures, the possibility of repairs etc), routing of passengers or freight processing.

And the flight plans to the various selected airports are worked out by the computer 2 on the basis of the criteria of optimization.

The computer 2 then classifies the various solutions found in a list as a function of one or more criteria of optimization, such as fuel consumption or the duration of the flight.

When the computation is finished, an indicator DIV 29 is displayed in the right-hand part of the strip 13 showing that at least one diversion flight plan meeting the criteria of selection and optimization has been computed. These flight plan solutions are displayed on the navigation map in the graphic window, for example in dashes starting from the exit point of the flight plan that was initially envisaged.

The flight plan solutions are preferably computed by using the segments of air routes, in allowing for the constraints of these segments (especially minimum and maximum altitudes and single directions) and also in allowing for the procedures of arrival and approach in force for the selected diversion airports. The diversion flight plans are computed preferably with an optimum altitude and an optimum speed depending on the performance characteristics of the aircraft, and the predetermined or chosen criteria of optimization.

Each one of these flight plan solutions is associated with a decision point corresponding to the limit point of the initial flight plan at which the pilot's decision to activate or not activate the new flight plan must come into play. This decision point is associated with an alarm, and the time and distance up to this point are displayed. The position of this point is given according to predetermined default parameters, but can be modified by the pilot.

Of course, the pilot can modify the criteria of selection and optimization, add further criteria or remove them and start a new computation.

The textual window 28 indicates especially the type and the cause of the diversion (where the type of the diversion is, for example, a standard or urgent diversion, and the cause corresponds to the event that has given rise to this diversion), the center and the radius of the search area, the criteria of optimization, the number of solutions found and, for each solution, the name of the diversion airport, the name of the exit point from the active flight plan towards the new flight plan, and the value of the criterion of optimization.

In this state, the pilot can eliminate one of the flight plan solutions after having selected it.

The pilot can also ask for explanations about a flight plan or an airport by pressing the key EXPLAIN. The pilot is then invited, by means of a cursor that can be shifted on the screen, to designate an unspecified airport 30 or a flight plan section forming part of the diversion flight plans previously considered by the computer 2 (screen 25). The computer then makes a display, in the message area 31, of the reason for which the designated object has been selected or not selected as a possible solution. If the designated object is a flight plan section, the computer displays the reason why this flight plan is a possible solution to the problem raised by the disturbing event. And if the designated object is an airport, it is either a solution airport, namely one corresponding to the landing airport of a flight plan solution, or an airport not chosen during the operation for preparing the flight plan solutions. The computer displays the reason why the designated airport has or has not been selected for the determination of the possible solutions.

When the key EXPLAIN is pressed again, the textual window 28 provides information, at a first level of detail, on the designated object, and in particular the significant variables that have justified the selection or non-selection of the designated object (flight plan or airport) of the flight plan as a solution.

Starting from the screen 25, the pilot may ask for even more detailed information, at a second level, by pressing the EXPLAIN button again. The computer 2 then makes a full-screen display of the page 26 which enables access to all the available information on the designated object, for example by means of a menu on this page 26, wherein the selection of an item of this page gives full-screen access to the desired textual information.

The information available comprises, for example, information on landing conditions (condition of the runways, predictions and landing performance characteristics, operational limits, minimum values of weather conditions, and current and foreseeable weather conditions), regulatory constraints (such as for example, the permitted category of approach, the landing weight of the aerodyne and the landing distance). This displayed data is updated automatically by the data link 15.

The pilot can also ask for the page of comparison between the flight plans that have been computed and selected previously as solutions, by pressing the button COMPARE FLPN. This key enables the full-screen display of a comparative table 32 of the active flight plan followed by the aerodyne with the flight plan solutions which are advantageously classified in an order corresponding to the predetermined or chosen criterion of optimization. For each flight plan, this table indicates the list of the way points and the associated predictions, namely the flying height and the overflying speed, the data on the point of exit from the initial flight is plan (the name of the point of exit, its distance from the current position of the aerodyne and the time taken to reach this point), as well as the estimated volume of fuel remaining at destination, the estimated time of arrival and the distance from the destination airport, the delay due to traffic and data on the wind, especially the mean wind on the route and the maximum wind that the aircraft can withstand without fuel-related difficulties on arrival.

From this screen 32, the pilot can press the key EXPLAIN in order to obtain more detailed information on one element or another that he must select in the comparative table.

Whatever the state, the EMERGENCY DIV key is always capable of being activated. This key enables the activation of a search for a diversion airport in the event of an emergency. If the pilot presses this key, the screen 22 appears and the computer 2 searches for one or more emergency diversion airports, namely the airports that are the closest possible to the current position of the aerodyne. Proximity is an additional criterion of selection. Once this search is finished, the computer provides a display, on the map, of the flight plans that it has determined along with explanations in the textual window 28 on the first flight plan solution selected. The flight plan solutions meet the prevailing criteria of selection and optimization.

Using the screens 22, 24, 25, 26 and 32, the pilot, by pressing the button BASIC of the strip 13, can return to the screen 23 which corresponds to the initial screen but takes account of the fact that a computation of diversion has been done. The graphic window 27 furthermore shows the first diversion flight plan 32 in the list of the flight plan solutions while the textual part 28 gives the significant parameters enabling the active flight plan to be compared with the diversion flight plan.

Figure 3:
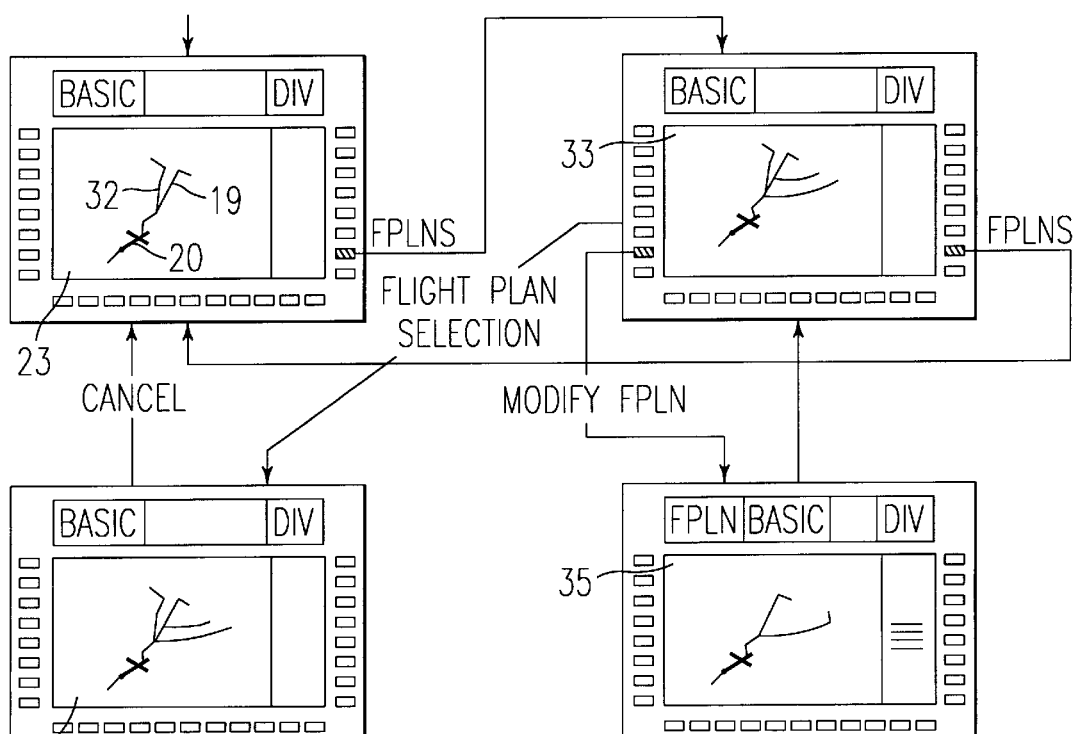
FIGS. 2 to 4 illustrate the sequencing of various screens displayed on the terminal of the system.

Using the screen 23, the pilot can modify a flight plan by pressing the key FPLNS, thus initiating a dialogue whose sequencing is illustrated in FIG. 3. The activation of this key prompts the display, by the computer 2, of all the previously selected flight plans (screen 33). Using this screen, the pilot can select a flight plan on the graphic window. This leads to the display of the screen 34 giving information, in the textual window, by which a comparison can be made between the active flight plan and the selected flight plan. The pilot can also press the key MODIFY FPLN. He is then asked to select the flight plan that he wishes to modify, this selection leading to the display of the screen 35.

The graphic window of the screen 35 shows the active flight plan and the selected flight plan, while the textual window gives the modifiable information on the selected flight plan for modification.

This information pertains, for example, to the flying height which the pilot may modify to take advantage of a favorable wind.

Figure 4:
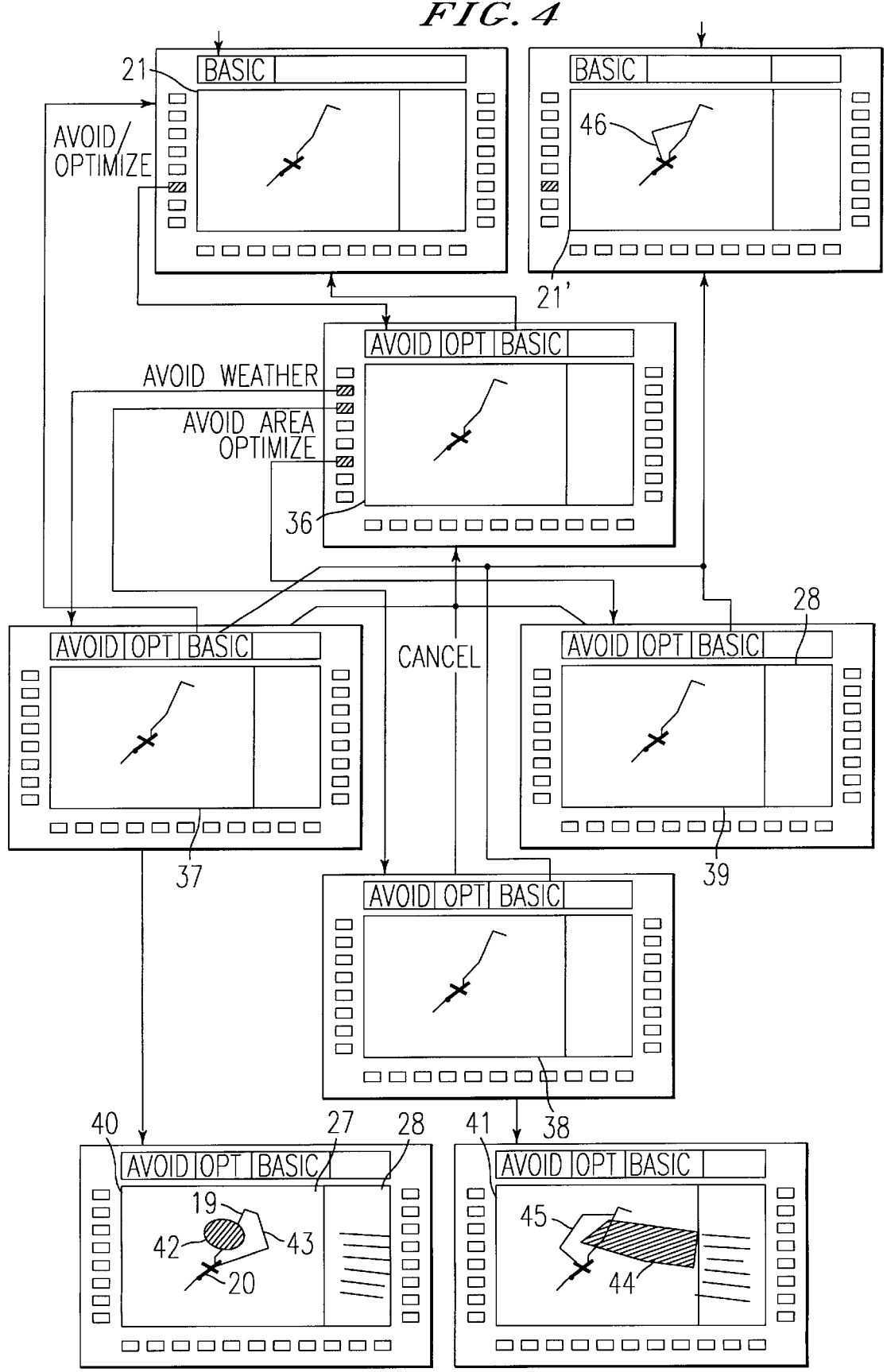

Using the screen 21, the pilot is able, by means of the key AVOID/OPTIMIZE, to initiate various functions for avoiding areas and optimizing the vertical flight plan (FIG. 4).

This key enables access to the screen 36, in which certain keys have been reconfigured so as to enable the selection of one of these functions.

If, using the screen 36, the pilot selects the function of avoiding a weather zone (by the key AVOID WEATHER), the screen 37 is displayed. In this screen, the graphic window shows the weather zones whose contours have been identified by the weather radar 9, or else transmitted by the data link.

Just as the screen 24 for determining a flight plan can be displayed upon the pilot's request or upon the reception of a corresponding event by the computer, this screen 37 which can be displayed upon the pilot's request is also displayed when the computer has received a message pertaining to an event requiring an avoidance of a weather area.

The selection of an area in the graphic window prompts the launching of the computation of an avoidance flight plan that is vertical or lateral depending on the type of weather area selected. It also prompts the display of the screen 40 which, in the graphic window 27, shows the contours of the selected area 42 in relation to the current position of the aerodyne 20 and the active flight plan 19, as well as the avoidance flight plan 43 for the avoidance of the area 42. The textual window 28 gives the type (lateral avoidance or vertical avoidance) and the cause (weather area) of modification of the flight plan, the point and angle of exit from the active flight plan, the avoidance margin, the point of return to the active flight plan, the parameters of prediction of the active flight plan and of the avoidance flight plan as well as the modifiable parameters of the new flight plan.

By the screen 36, the pilot can also use the key AVOID AREA to activate the function for avoiding a restricted-access area. This enables the display of the screen 38 showing the contours of the areas in question on the displayed map.

The screen 38 can also be displayed when-the computer has received a message on an event requiring the avoidance of a restricted-access area.

The selection of an area by the pilot enables the activation of the area avoidance computation by the computer 2, and the display of the screen 41 showing the position of the aerodyne 20, the active flight plan 19, the contours of the selected area 44, as well as the avoidance flight plan 45 that has just been computed. As in the case of the screen 37, the textual screen 28 give the values of the modifiable parameters of the avoidance flight plan. In the case of the screen 38, the type and cause of the modification of the flight plan are respectively a lateral avoidance and a fixed area.

The area to be avoided can also be plotted by the pilot directly on the map displayed in the graphic window 27.

By means of the screen 36, the pilot can also activate the function of optimization of the vertical flight plan (using the key OPTIMIZE), thus prompting the display of the screen 39 giving access to the modifiable flight heights of the flight plan in the textual window 28. The screen 39 can also be displayed upon reception by the computer of an event requiring the optimization of the vertical flight plan.

The activation of the key BASIC in the strip 13 makes it possible, through the screens 36 to 41, to return to the screen 21 if no avoidance flight plan or modified flight plan has been validated and, if not, to the screen 21'. This screen 21', in addition to the particulars displayed on the screen 21, gives the new flight plan 46 which has been validated.

It must be noted that the function EXPLAIN described here above is accessible from the screens 21' and 36 to 41, to furnish explanations on any information computed by the computer 2 and selected for this purpose.

After the validation of the modifications made in the screens 35, 39, 40 and 41, the computer 2 computes and updates the prediction parameters displayed.

Furthermore, the computer 2 takes account of the various pieces of information that it receives from the other items of on-board equipment 9, 14, 15, 16 in order to update:
- the current position of the aerodyne,
- the data pertaining to the diversion of the flight,
- the weather data displayed,
- the parameters relating to the flight plan solutions computed,
- and, as the case may be, the list of the solutions if certain flight plans of the list have become non-valid, or if certain flight plans not selected have become valid.

When a new flight plan has been validated by the pilot, a key on the terminal 4 can be used to order the dispatch of this new flight plan through the data link 15 to the air traffic control station and to the flight management system FMS 14 that carries out the automatic piloting of the aerodyne.

What is claimed is:

1. A method of assisting a pilot with the piloting of an aerodyne, said method implemented by a system comprising a processor, at least one man/machine communications terminal including a display screen and a control and data entry unit, and memories in which there are stored all the information necessary for carrying out a flight, wherein, in order to define a new flight plan to meet a new situation caused by a disturbing event, the method comprises the steps of:

monitoring a context in which the aerodyne is located and interpreting the disturbing event to determine possible corrective actions to be undertaken;

analyzing possibilities of reconfiguring a flight plan, that correspond to the possible corrective actions as a function of a set of criteria that are predetermined in relation to a type of disturbing event and modifiable by the pilot;

devising flight plan solutions that meet the predetermined criteria; and presenting, to the pilot, said flight plan solutions in association with significant parameters that served as grounds for said devising of said flight plan solutions.

2. A method according to claim 1, wherein said monitoring step comprises the reception by the processor of an item of information announcing the disturbing event, the defining by the processor of a corrective action, and displaying, on the display screen, of the corrective action to be undertaken;

said analyzing and devising steps comprise the computation, by the processor, of the flight-plan solutions that correspond to the corrective action and meet a set of criteria that are predetermined and modifiable by the pilot, the computation being performed on the basis of a navigation data base contained in the memories and also on the basis of the data given by electronic equipment on-board the aerodyne and connected to said system; and said presenting step comprises the display, on the display screen, of a navigation map, the display, on the navigation map, of the flight plan solutions in association with the criteria justifying their selection as solutions, and the display, on request, of detailed information on a flight plan indicated by the pilot from among the flight plan solutions displayed on the navigation map of the display screen.

3. A method according to claim 1, wherein the corrective actions include at least one of a diversion to a change in the destination airport, a modification of a lateral flight plan, and a modification of a vertical flight plan, and the dangerous event corresponds to at least one of a detection of a dangerous weather phenomenon, a serious malfunctioning of the aerodyne, a problem at the destination airport, a problem in the air traffic control system;

and a problem with regard to the passengers of the aerodyne.

4. A method according to claim 2, further comprising the step of;

displaying, at a first level of detail, significant parameters that have determined a selection, by way of a solution, of at least one of a flight plan and an airport that has been designated beforehand by the pilot upon the presentation of the flight plan solutions.

5. A method according to claim 3, further comprising the step of:

displaying, at a first level of detail, significant parameters that have determined a selection, by way of a solution, of at least one of a flight plan and an airport that has been designated beforehand by the pilot upon the presentation of the flight plan solutions.

6. A method according to claim 4 further comprising the display, at a second level of detail, of all information on an airport that has been designated beforehand by the pilot.

7. A method according to claim 1 further comprising the step of:

presenting all data taken into account by the system for the defining of the flight plan solutions.

8. A method according to claim 1, further comprising the step of:

real-time updating of the flight plan solutions as a function of at least one of information given by electronic equipment on-board the aerodyne and connected to said system, and information coming from a ground station.

9. A method according to claim 1, wherein each flight plan solution of a diversion is computed by using segments of air routes and by taking account of approach and arrival procedures at a corresponding diversion airport.

10. A method according to claim 2, wherein each flight plan solution of a diversion is computed by using segments of air routes and by taking account of approach and arrival procedures at a corresponding diversion airport.

11. A method according to claim 1, further comprising the step of:

presenting, to the pilot, a decision point corresponding to a limit point of an active flight plan to initiate a new flight plan, as well as presenting, to the pilot, a time and distance up to said decision point.

12. A method according to claim 1 wherein, in the event of a multiplicity of disturbing events, the corresponding corrective actions are determined and processed by order of priority.

13. A method according to claim 1, wherein the analyzing step is limited to diversion airports that are located in a predefined search zone, a position and size of which is modifiable by the pilot.

14. A method according to claim 13, wherein the position and size of the predefined search zone depend on the corrective actions.

15. A method according to claim 1, further comprising the step of:

classifying the flight plan solutions as a function of at least one criterion of optimization.

16. A method according to claim 1, further comprising the step of:

displaying a comparative table containing the values of significant parameters of an active flight plan and of the flight plan solutions.

17. A method according to claim 1, wherein the control unit takes account of modifications of the parameters of a flight plan solution, said modifications being entered by the pilot.

18. A method according to claim 1, wherein the control unit takes account of a elimination of one of the flight plan solutions, said elimination being entered by the pilot.

19. A method according to claim 1, wherein the system sends a flight plan solution validated by the pilot to an automatic pilot device so that said flight plan solution is followed by said device.

* * * * *